United States Patent [19]
Nagai

[11] Patent Number: 5,982,564
[45] Date of Patent: Nov. 9, 1999

[54] OBJECTIVE LENS DRIVING APPARATUS

[75] Inventor: Koichi Nagai, Kanagawa-ken, Japan

[73] Assignee: Kabushiki Kaisha Toshiba, Kawasaki, Japan

[21] Appl. No.: 08/778,411

[22] Filed: Dec. 31, 1996

[30] Foreign Application Priority Data

Mar. 28, 1996 [JP] Japan .................................. 8-073393

[51] Int. Cl.[6] .................................................. G02B 7/02
[52] U.S. Cl. .......................... 359/814; 359/824; 359/823; 359/813
[58] Field of Search ................................... 359/814, 824, 359/823, 813

[56] References Cited

U.S. PATENT DOCUMENTS 5,541,763  7/1996  Suzuki et al. ............................ 359/814
5,623,372  4/1997  Matsui .................................... 359/814

OTHER PUBLICATIONS

The Transactions of the Institute of Electronics, Information and Communication Engineers C–II vol. J77–C–II No. 9 pp. 408–409; T.Komori et al.; Sep. 1994 (Japan).

Primary Examiner—Frank G. Font
Assistant Examiner—Reginald A. Ratliff
Attorney, Agent, or Firm—Cushman Darby & Cushman

[57] ABSTRACT

An objective lens holder that holds an objective lens that directs a laser beam onto a disk is formed of a permanent magnet. Yokes are arranged at the periphery of the objective lens holder, with a focus coil and tracking coil fixed to them. One end of a wire-shaped flexible body is connected to one side face of the objective lens holder, the objective lens holder being thereby suspended and supported. Since the objective lens holder has applied to it displacement components with five degrees of freedom, excluding the axial direction of the flexible body, tilting of the optical axis of the objective lens can be generated. Consequently, coma aberration of the objective lens is reduced and high density recording and reproducing can be achieved.

23 Claims, 3 Drawing Sheets

OBJECTIVE LENS DRIVING APPARATUS

BACKGROUND OF THE INVENTION

1. Field of the Invention

This invention relates to an objective lens driving apparatus used for recording and reproducing data in respect of an information recording medium such as an optical disk.

2. Description of the Related Art

As is well known, optical disk devices are widely employed in which data is stored and retrieved using a laser beam. Typical examples are compact disk device (CD) and laser disk device (LD). Recently, optical disk devices have come to be employed as storage devices for computers.

When information is recorded onto or reproduced from an optical disk, a laser beam is focused onto the optical disk surface by an objective lens to form a spot. The smaller the size of this spot, the greater the recording density of the optical disk that can be achieved. As technology advances, recording density increases. Therefore, new technology such as DVD, requires ever smaller spot sizes.

Furthermore, to maintain the size of the spot as small as possible, it is important to exercise control such that the optical axis of the objective lens is as near as possible perpendicular to the optical disk surface, so as to produce a condition in which little coma aberration can occur. Coma aberration may occur if the objective lens is out of alignment, for example, or if the optical disk is out of alignment because of, for example, warping.

A known objective lens drive construction whereby such control can be achieved involves supporting the objective lens for example by means of four wires. Such an objective lens driving device is constructed so as to make possible not only displacement of the focusing direction and the tracking direction but also axial rotary displacement for correcting a tilt of the optical axis of the objective lens, by means of focusing coils and tracking coils arranged at the periphery of the objective lens.

However, in order to correct a tilt of the optical axis of the objective lens in high accuracy, desired biaxial rotary displacement should occur. Furthermore, large variations in wire shape result in imbalance of the drive characteristic, making it very difficult to achieve the desired operating characteristic. Thus the device ends up becoming impracticable.

SUMMARY OF THE INVENTION

As described above, in conventional objective lens driving apparatus, the construction was complicated, so miniaturization of the device was impeded, and it was difficult to obtain a high control range and high-accuracy position.

Accordingly an object of this invention is to provide an objective lens driving apparatus with a simple construction whereby correction can be performed not just in the focusing direction and tracking direction but also of biaxial rotation producing tilting of the optical axis.

In order to achieve this object, an objective lens driving apparatus according to this invention comprises an objective lens for directing a laser beam onto an optical information recording medium, an objective lens holder for holding said objective lens, a single wire for suspending and supporting said objective lens holder, one end thereof being connected to said objective lens holder, and an electromagnetic driver for effecting electromagnetic force to said objective lens holder.

It should be noted that the objective lens holder can be constituted so as to provide a magnetic property. Also, it is possible to provide at least three or more focusing coils for driving said objective lens holder in the optical axis direction provided in a non-contacting relationship with said objective lens holder. Also, it is possible to provide a tracking coil for driving said objective lens holder in a direction perpendicular to the optical axis provided in a non-contacting relationship with said objective lens.

Also, the wire can be constituted so as to extend in a direction perpendicular to the optical axis direction of said objective lens.

The objective lens holder may be constituted so that its center of gravity lies on the line of extension of said wire. The objective lens holder may include a permanent magnet. Also, the objective lens holder may be constituted so as to be affected magnetic attractive force in at least the direction in which the tension in said wire acts.

It should be noted that the objective lens holder is formed with a curved surface shape on the side facing said coils.

Furthermore, according to this invention there is provided an objective lens driving apparatus comprises an objective lens for directing a laser beam onto an optical information recording medium, an objective lens holder for holding said objective lens, a flexible body whereof one end is connected to said objective lens holder for suspending and supporting said objective lens so as to permit said objective lens holder a linear motion component in an optical axis direction and direction perpendicular to the optical axis direction of said objective lens, and a biaxial rotational component that generates tilting of the optical axis, and an electromagnetic driver for effecting electromagnetic force to said objective lens holder.

It should be noted that the objective lens holder can be constituted so as to provide a magnetic property. Also, it is possible to provide at least three or more focusing coils for driving said objective lens holder in the optical axis direction provided in non-contacting relationship with said objective lens holder. Also, it is possible to provide a tracking coil for driving said objective lens holder in a direction perpendicular to the optical axis provided in non-contacting relationship with said objective lens.

Also, the flexible body can be constituted so as to extend in directions perpendicular to the optical axis direction of said objective lens.

The objective lens holder may be constituted so that its center of gravity lies on the line of extension of said flexible body. The objective lens holder may include a permanent magnet. Also, the objective lens holder may be constituted so as to be affected magnetic attractive force in at least the direction in which the tension in said flexible body acts.

It should be noted that objective lens holder is formed in a curved surface shape on the side facing said coils.

Moreover, according to this invention there is provided an objective lens driving apparatus comprises an objective lens for directing a laser beam onto an optical information recording medium, an objective lens holder for holding said objective lens, a couple of wires whereof one respective end is connected to said objective lens holder for suspending and supporting said objective lens so as to permit to said objective lens holder a linear motion component in an optical axis direction and direction perpendicular to the optical axis direction of said objective lens, and a biaxial rotational component generating tilt of the optical axis, and an electromagnetic driver for effecting electromagnetic force to said objective lens holder.

It should be noted that said wires are arranged in positions restricting the rotational component of said objective lens about the optical axis. Also, said wires have a surface extending in the direction perpendicular to the optical axis of said objective lens and are arranged next to each other in the surface.

With the invention constructed as above, the objective lens which is supported on the object lens holder can be suspended and supported by a very simple construction such as to permit biaxial rotation components generating tilt of the optical axis. The tilt of the objective lens can therefore be corrected so coma aberration can be reduced, making possible high-density recording and reproducing of information.

DETAILED DESCRIPTION OF THE PREFERRED EMBODIMENTS

Embodiments of this invention are described below with reference to the drawings.

Figure 1:
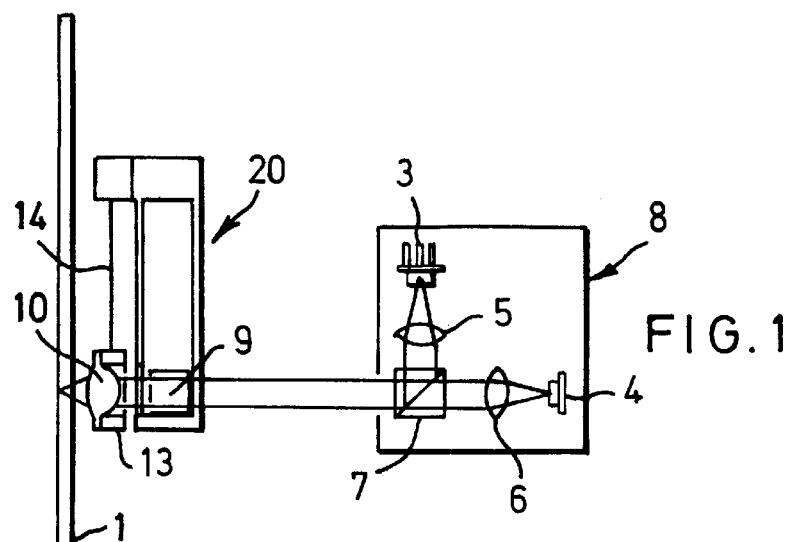
FIG. 1 is a constructional diagram showing the overall construction of an objective lens driving apparatus.
Figure 2:
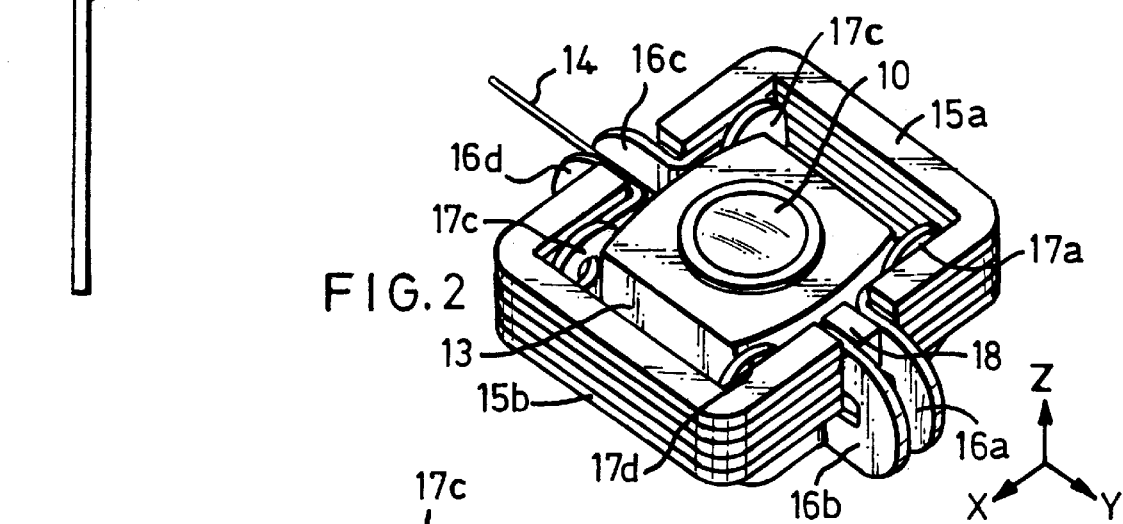
FIG. 2 is a perspective view showing a major portion of a first embodiment of an objective lens driving apparatus.
Figure 3:
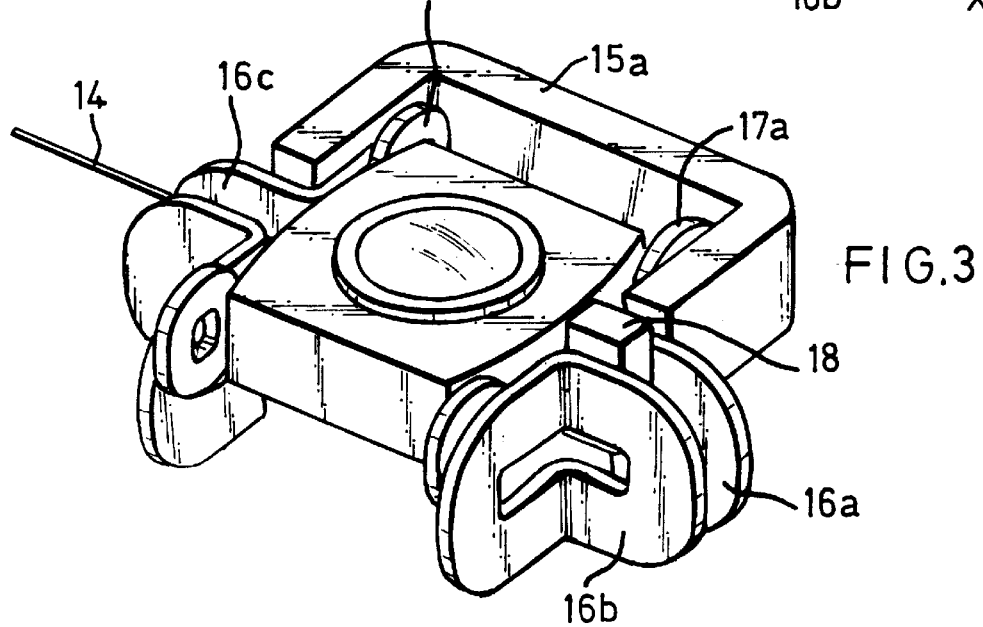
FIG. 3 is a perspective view with a component shown in FIG. 2 partially removed.

FIG. 1 is a constructional diagram showing the overall construction of a first embodiment of an objective lens driving apparatus. FIG. 2 is a perspective view showing a major portion of an objective lens driving apparatus. FIG. 3 is a perspective view with a component in FIG. 2 partially removed.

Figure 4:
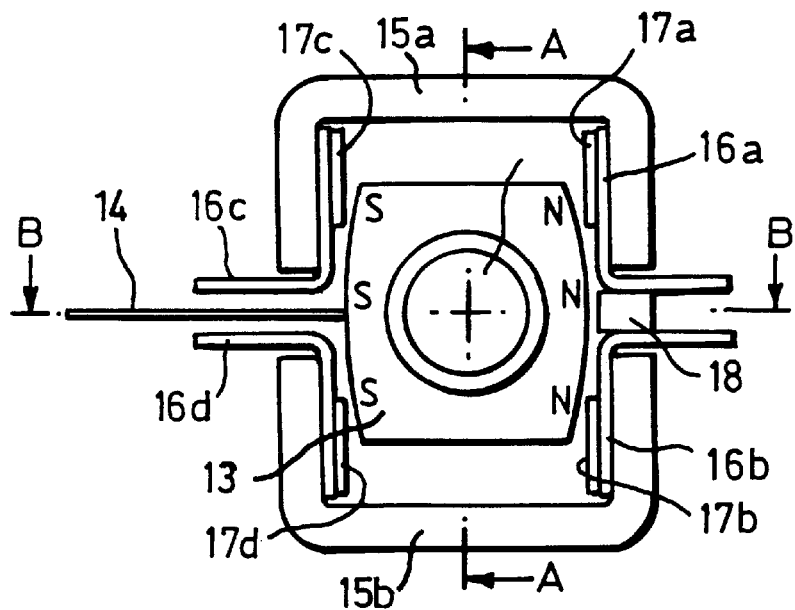
FIG. 4 is a plan view of FIG. 2.
Figure 5:
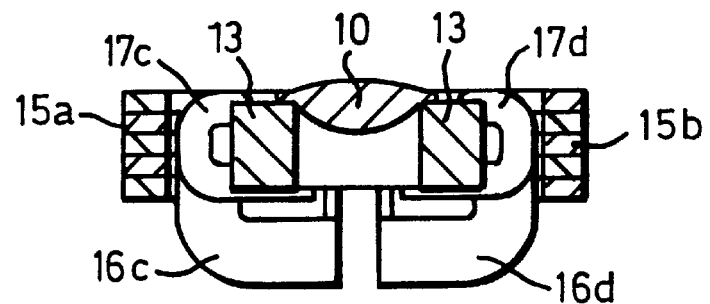
FIG. 5 is a cross-sectional view along the line A—A of FIG. 4.
Figure 6:
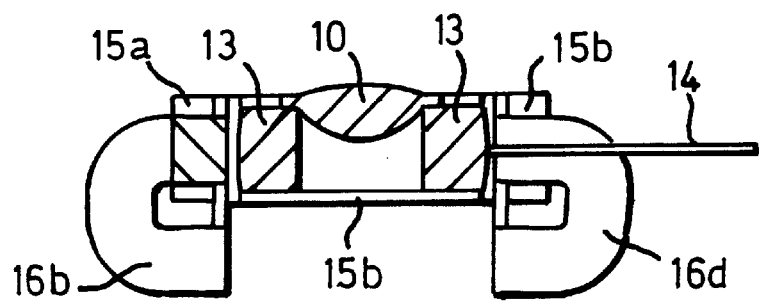
FIG. 6 is a cross-sectional view along the line B—B in FIG. 4.

FIG. 4 is a plan view of FIG. 2. FIG. 5 is a cross-sectional view along the line A—A of FIG. 4. FIG. 6 is a cross-sectional view along the line B—B in FIG. 4.

A disk 1 provided for recording/reproducing information is held by chucking means such as a magnetic chuck on a spindle motor 2 that is fixed to a base (not shown) so that it can be driven in rotation in stable fashion by the spindle motor 2 during recording or reproducing information. In this embodiment, the disk 1 may be any optical information recording medium such as an optical disk (for example CD-ROM, DVD etc.), a magneto-optical disk, or a phase-change disk etc.

A semiconductor laser 3 that generates a laser beam that is to be directed onto disk 1, together with a photo detector 4, collimator lens 5, condenser lens 6, and deflection prism 7, constitutes an optical unit 8. This optical unit 8 is fixed onto a base.

The laser beam emitted from the semiconductor laser 3 is changed in direction by 90° by deflecting prism 7 after passing through collimating lens 5, and is output from optical unit 8. This laser beam is changed in direction by 90° by the reflecting mirror surface of a mirror 9, whence it is directed to objective lens 10, which is arranged at the top of optical head 20. The laser beam is then focused onto a recording track on disk 1 by the objective lens 10, to form a focal point. The reflected light beam from disk 1 returns to objective lens 10 and, passing by way of mirror 9, passes through deflecting prism 7 to be returned to photo detector 4.

Objective lens 10 that focuses the laser beam onto the recording track of disk 1 is fixed on the upper surface of an objective lens holder 13. Objective lens holder 13 is formed of a permanent magnet whose direction of magnetization is set such that the left and right side faces thereof shown in FIG. 4 are respectively an N pole and an S pole. Also, the side faces corresponding to this N pole and S pole are formed with a curved shape such that they curve gradually towards the edge (see FIG. 4 and FIG. 6).

One end of a wire-like flexible body 14 is fixed to the side face of this objective lens holder 13. Flexible body 14 is constituted of single wire and is made of non-magnetic material such as for example stainless steel or phosphor bronze, and suspends and supports objective lens holder 13. Also, the center of gravity of the entire movable unit including objective lens 10, objective lens holder 13, and focusing coil and tracking coil (to be described) are arranged on the line of extension of the flexible body 14 (in the vicinity of the center of objective lens 10). The other end of flexible body 14 is fixed to optical head 20.

Yokes 15a, 15b which are roughly of U-shaped cross-section are arranged symmetrically at the periphery of objective lens holder 13. In yokes 15a, 15b, a plurality of thin sheets of ferromagnetic material (for example steel sheet) are formed in laminated condition with insulators (e.g. epoxy or enamel etc.) interposed between them. Yokes 15a, 15b are fixed so as to be integral with optical head 20 at their lower surface.

Respective focusing coils 16a, 16b, 16c, 16d are fixed in the vicinity of each end of yokes 15a, 15b. Focusing coils 16a, 16b, 16c, 16d are constituted of flat-wound thin coils having a shape bent from the vicinity of their middle. Focusing coils 16a, 16b, 16c, 16d are electrically insulated from each other, the yokes 15a, 15b, and the objective lens holder 13. Also, as shown in FIG. 3 and FIG. 5, their upper edges of focusing coils 16a, 16b, 16c, 16d are fixed by means such as adhesion to yokes 15a, 15b such that the inside faces of yokes 15a, 15b are opposite the side faces (magnetized faces) of objective lens holder 13.

Also, thin tracking coils 17a, 17b, 17c, 17d, which are likewise flat-wound, are arranged at the surface of focusing coils 16a, 16b, 16c, 16d and, as shown in FIG. 3 and FIG. 4, are adhesively fixed in the vicinity of the ends of focusing coils 16a, 16b, 16c, 16d. It should be noted that the side edges of tracking coils 17a, 17b, 17c, 17d (i.e. the sides thereof nearer to objective lens holder 13) are exactly opposite the side faces (magnetized faces) of objective lens holder 13. Tracking coils 17a, 17b, 17c, 17d are electrically insulated from the focusing coils 16a, 16b, 16c, 16d as well as the yokes 15a, 15b and the objective lens holder 13.

An auxiliary yoke 18 consisting of ferromagnetic material (for example steel material like iron) is fixed between yokes 15a, 15b and in a position clamped by the two focusing coils 16a, 16b. Auxiliary yoke 18 is opposite the N pole of objective lens holder 13 and is arranged on the line of extension of flexible body 14.

With an objective lens driving apparatus constructed as above, a recorded information signal, a focus offset signal and a track offset signal etc. are generated from the reflected light beam picked up by photo detector 4. The positional offset in the focusing direction of objective lens 10 is detected using the focus offset signal and a control operation is performed so as to supply prescribed currents to focusing coils 16a, 16b, 16c, 16d such as to correct this positional offset. Also, the positional offset in the tracking direction of objective lens 10 is detected by means of the track offset signal, and a control operation is performed by applying voltages to the linear motor coil (coil for driving optical head 20: not shown) and tracking coils 17a, 17b, 17c, 17d in order to correct this positional offset.

In an objective lens driving apparatus of this invention constructed in this way, objective lens holder 13 carrying the objective lens 10 is supported by an flexible body 14, which is constituted of a single wire. Consequently, excluding the linear motion component in the axial direction of flexible body 14, objective lens holder 13 is allowed five degrees of freedom (linear motion component in the X-axis direction, rotational component about the X-axis direction, rotational component about the Y-axis direction, linear motion component in the Z-axis direction, and rotational component about the Z-axis direction, as indicated in FIG. 2).

If now the respective driving forces of the four focusing coils 16a, 16b, 16c and 16d are Ffa, Ffb, Ffc, and Ffd, focus driving force Ff can be represented by the following equation:

$$Ff=Ffa+Ffb+Ffc+Ffd \quad (1)$$

The laser beam can be focused at a focal point on disk 1 by displacing objective lens 10 in the optical axis direction (Z-axis direction) using this focus driving force Ff.

Furthermore, by utilizing the resultant of the driving forces of the four tracking coils 17a, 17b, 17c, 17d, objective lens 10 can be displaced in the direction (X-axis direction) respectively perpendicular to the axial direction of the flexible body 14 and the optical axis direction of objective lens 10, so that the focal point of the laser beam can be made to coincide with the desired track on disk 1.

Also, a rotational component is generated on the objective lens 10 about its optical axis (about the Z-axis), but, if objective lens 10 has an axially symmetric shape about the optical axis, there is no particular need to positively control this rotational component. It should be noted that, since this rotational component is generated about the optical axis of objective lens 10, it cannot change its optical characteristics and cannot have an adverse effect on recording and reproducing information etc.

Apart from the three degrees of freedom described above, a further two degrees of freedom can be produced by the device construction of this invention. These two degrees of freedom are biaxial rotational components (about the X-axis direction and about the Y-axis direction) perpendicular to the optical axis of objective lens 10. These degrees of freedom will be explained below.

In the construction of the embodiment shown in FIG. 2 to FIG. 6, the center of gravity of objective lens holder 13 is on the optical axis of objective lens 10, and objective lens holder 13, yokes 15a, 15b, focusing coils 16a, 16b, 16c, 16d are plane-symmetric with respect to the two planes represented by the plane containing the optical axis of objective lens 10 and flexible body 14 (Y-Z plane), and the plane perpendicular to this (X-Z plane).

The rotational force θ x about the X axis can be expressed by the following equation.

$$\theta x=(Ffa+Ffb)-(Ffc+Ffd) \quad (2)$$

and the rotational force θ y about the Y-axis can be expressed by the following equation.

$$\theta y=(Ffa+Ffc)-(Ffb+Ffd) \quad (3)$$

The optical axis of objective lens 10 can be tilted in any desired direction by controlling focusing coils 16a, 16b, 16c, 16d using the relationships shown in equations (2) and (3). Position control of objective lens 10 can therefore be achieved such as to maintain the optical axis of objective lens 10 in a condition that is always perpendicular with respect to the surface of disk 1.

It should be noted that, in this embodiment, as shown in FIG. 2 to FIG. 6, since objective lens holder 13 and yokes 15a, 15b have a shape that is linearly symmetric with respect to the Y-Z plane, equations (2) and (3) can be adopted practically without modification. In a case where the construction of the apparatus was not linearly symmetric, it would be necessary to multiply the respective terms of equations (2) and (3) by suitable coefficients corresponding to the distance ratio from the position of the center of gravity. In this way, the same position control can be performed even when the device construction is not plane-symmetric.

Thus, in this embodiment, the construction is such that the three axes are controlled by four focusing coils 16a, 16b, 16c, and 16d. However, in fact, in order to achieve three-axis control, it is sufficient if there are three focusing coils. More reliable positive position control of objective lens 10 can therefore be achieved by the construction as in this embodiment employing four focusing coils 16a, 16b, 16c, 16d. Of course, the device could be constituted using only three focusing coils.

Also, in this embodiment, the two side faces (faces where the magnetic poles are provided) of objective lens holder 13 are formed in curved shape so that they gradually curve towards the edges. If these side faces were to be made planar, when for example the optical axis of the objective lens 10 was tilted or was displaced in the tracking direction, the magnetic attractive force on yokes 15a, 15b would become locally larger. But in general, it is known that the attractive force between a magnet and a yoke shows an abrupt increase where the distance between these two gets small. As a result, depending on the mounting position of the stopper (not shown) that restricts the range of movement of objective lens holder 13, the magnetic attractive force of objective lens holder 13 and yokes 15a, 15b may exceed the elastic stability force of flexible body 14, with the result that objective lens holder 13 will be forced into contact with the stopper. Further, the risk could arise that, in the worst case, the electromagnetic driving force produced by the coil might be exceeded, resulting in a condition from which recovery is impossible.

That is, by making the magnetic pole faces of objective lens holder 13 of two-dimensionally curved shape as in this embodiment, it is possible to make the magnetic attractive force of objective lens holder 13 and yokes 15a, 15b practically fixed over the opposing surface. Objective lens holder 13 can therefore be reliably maintained in its neutral position when the device is not actuated by utilizing the stability force of flexible body 14, and the reliability of the apparatus can thereby be increased.

It should be noted that practically the same effect as in the case of the embodiment described above can be obtained even if the magnetic pole faces (curved faces) of objective lens holder 13 are covered with a non-magnetic material such as plastics, thereby providing the magnetic pole faces with a planar finish. Alternatively, practically the same effect as in the case of the embodiment described above can be obtained by making the magnetic pole faces of the objective lens holder 13 of originally planar shape and finishing them to a curved-surface shape by covering them with a magnetic material.

Also, it is possible to adjust the flow of magnetic flux such that objective lens holder 13 is restored to its neutral position by making the curvature of the magnetic pole faces of objective lens holder 13 smaller.

Furthermore, in this embodiment, an auxiliary yoke 18 is arranged on the opposite side (between yokes 15a, 15b) to flexible body 14, sandwiching objective lens 10. Due to the mounting of auxiliary yoke 18 in this way, somewhat larger magnetic attraction is applied to objective lens holder 13 on the side facing the auxiliary yoke 18 than on the side facing flexible body 14, so that flexible body 14 is normally under tension. Controlling the position of objective lens holder 13 is thereby greatly facilitated since it is achieved by positively removing flexure of flexible body 14.

It should be noted that the magnetic attractive force generated on the right side of line A—A in FIG. 4 may be made stronger since the magnetic circuit formed by objective lens holder 13 and yokes 15a, 15b is asymmetric as between the right and left side of this line A—A. The same effect can thereby be anticipated as in the case where an auxiliary yoke 18 is provided. Specifically, the distance between the magnetic pole face S and the yoke on the side facing the flexible body 14 (i.e. the magnetic gap) can be set to be longer than the distance between the magnetic pole face N and the yoke on the opposite side. Of course, methods such as changing the shape of the yoke could also be adopted.

If any of these methods (or a combination of these methods) is adopted, the magnetic attractive force acting between objective lens holder 13 and yokes 15a, 15b becomes smaller on the side facing the flexible body 14. Consequently, when objective lens holder 13 is displaced in the optical axis direction (Z-axis direction) of objective lens 10, the attractive force in the Z-axis direction acting on objective lens holder 13 is smaller on the side facing flexible body 14. It is therefore desirable to correct the tilt of the optical axis of objective lens 10 by some means such as adjustment of the quantity of current flowing to the four focusing coils 16a, 16b, 16c, 16d, such as to make the magnetic attractive force of appropriate magnitude. Interference wherein rotational movement about the X-axis is produced by actuation of objective lens 10 in the optical axis direction (Z-axis direction) can thereby be alleviated, so enabling effective control to be achieved by an uncomplicated control system without having to consider such interference.

Likewise, the effect may be anticipated that it is possible to prevent the displacement of the objective lens holder 13 being larger on the opposite side (N pole side) than on the side facing the flexible body 14 (S pole side) when objective lens holder 13 is actuated in the tracking direction (X axis direction).

Also, as mentioned above, yokes 15a, 15b in this embodiment are formed by laminating a plurality of thin iron sheets with insulating material (for example epoxy or enamel etc.) arranged between them. If the yokes were to be formed of a single material, heating of the interior of the yokes would be produced by generation of eddy current in the interior during movement of the objective lens holder 13, depending on the speed of this movement. However, thanks to the use of yokes made of laminated iron sheets with insulation, the generation of eddy current can be restrained.

Furthermore, the auxiliary yoke 18 prevents occurrence of oscillation of objective lens holder 13, thus enabling reliable positional control to be achieved.

Also, the flexible body 14 of this embodiment consisted of single wire made of a non-magnetic material such as stainless steel or phosphor bronze.

Figure 8:
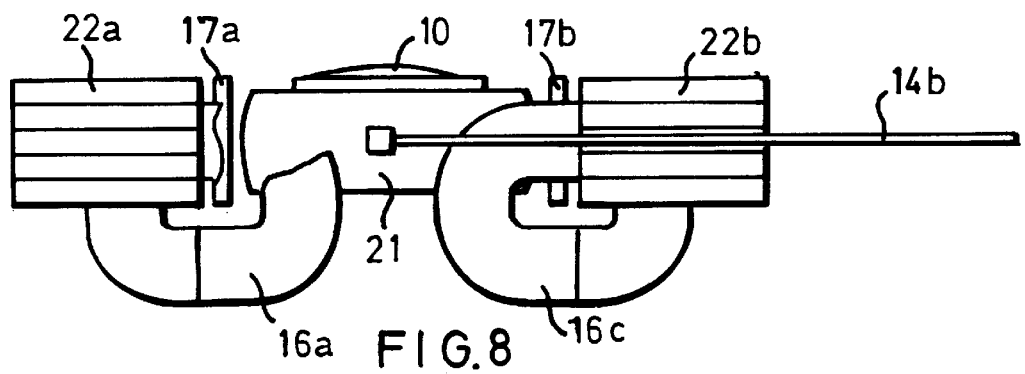
FIG. 8 is a side view of FIG. 7.
Figure 9:
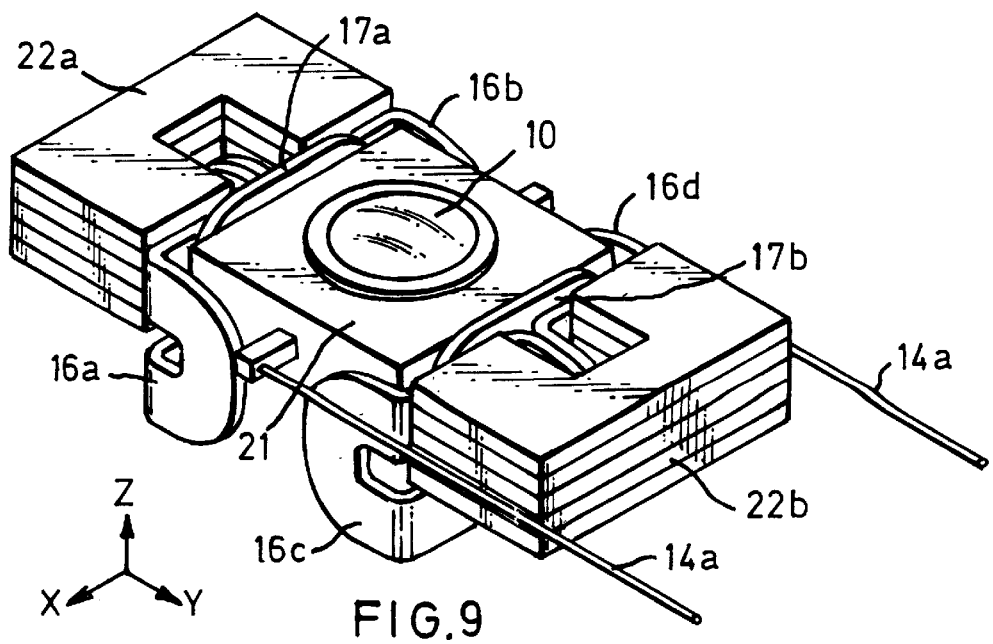
FIG. 9 is a perspective view of FIG. 7.

A second embodiment of this invention will now be described with reference to FIG. 7 to FIG. 9. Structural elements which are identical with those of the first embodiment described above are given the same symbols and repeated description is omitted.

Figure 7:
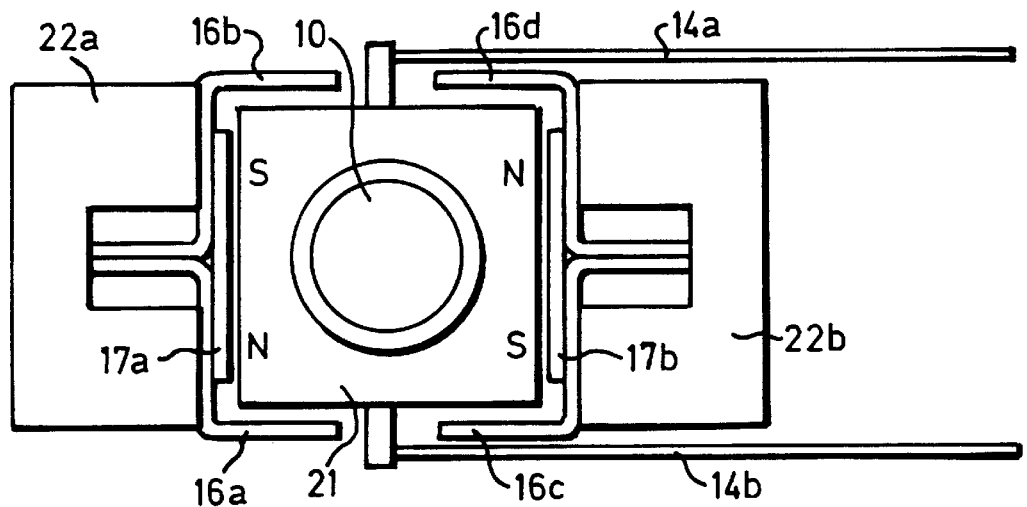
FIG. 7 is a plan view showing a major portion of a second embodiment of an objective lens driving apparatus according to this invention.

FIG. 7 is a plan view of a major portion of an objective lens driving apparatus according to the second embodiment of this invention. FIG. 8 is a side view thereof, and FIG. 9 is a perspective view thereof.

The characterizing feature of this embodiment is that the objective lens is suspended and supported by a couple (two) of flexible bodies.

Objective lens holder 21 on which objective lens 10 is carried is suspended and supported by a couple of flexible bodies 14a, 14b arranged in a plane (X-Y plane) passing through the center of gravity of objective lens holder 21 and perpendicular to the optical axis of objective lens 1. In this embodiment also, objective lens holder 21 consists of a permanent magnet, but, as shown in FIG. 7, it is magnetized such that an N pole and S pole are formed respectively at the left and right side faces.

Yokes 22a, 22b fixed to a base are arranged at positions opposite to the magnetic pole faces of objective lens holder 21. Four focusing coils 16a, 16b, 16c, 16d and two tracking coils 17a, 17b are fixed to yokes 22a, 22b.

These focusing coils 16a, 16b, 16c, 16d are constituted by bending flat-wound insulated thin coils in a shape which is bent at two locations alternately. As shown in FIG. 8 and FIG. 9, the upper edges of focus coils 16a, 16b, 16c, 16d are fixed by means such as adhesion to yokes 22a, 22b facing the inside face of yokes 22a, 22b and the side face (magnetized face) of objective lens holder 21.

Also, thin tracking coils 17a, 17b, which are likewise flat-wound insulated coils, are fixed to the surface of focusing coils 16a, 16b, 16c, 16d. Specifically, as shown in FIG. 8 and FIG. 9, tracking coil 17a is adhesively fixed so as to span focusing coils 16a, 16b and tracking coil 17b is adhesively fixed so as to span focus coils 16c, 16d, respectively. Both side edges of tracking coils 17a, 17b are exactly facing the side faces (magnetized face) of objective lens holder 21, one side edge facing the N pole, while the other side edge faces the S pole, respectively.

With this embodiment constructed as above, since two flexible bodies 14a, 14b are employed, one degree of freedom can be restricted in comparison with the first embodiment described above. This restricted degree of freedom corresponds exactly to rotation of objective lens 10 about the optical axis (about the Z-axis), so, functionally, there is no difference from the first embodiment. However, since rotation about the Z-axis is structurally restrained, there is no need to form the side faces of the objective lens holder in a two-dimensionally curved surface shape as in the case of the first embodiment. It suffices if the shape of the objective lens holder is curved only in the direction seen from the cross-section shown in FIG. 8 (i.e. one dimensionally).

In all the embodiments described above, flexible wire can be made not only of stainless steel but also of phosphor bronze, copper, and steel etc.

Also, viscoelastic material such as gel could be put on flexible wire for stabilizing vibration.

Furthermore, the partial diameter of flexible wire could be changed in order to control and adjust the ratio between rotational stiffness and translational stiffness. In particular, reducing the diameter of root portion of the flexible wire is effective.

This invention is not restricted to the embodiments described above, but could of course be put into practice modified in various ways within the scope of its essence.

For example, although the objective lens holder in these embodiments was constituted using a permanent magnet, a construction could be adopted in which a permanent magnet was mounted adhesively onto an objective lens holder formed of for example non-magnetic material such as resin.

Also, all the coils could be mounted on the objective lens holder, the permanent magnet and yoke being mounted on the yoke side. If such a construction is adopted, there is no need to make the magnetic pole faces of the permanent magnet curved surfaces.

As described above, with this invention, an objective lens driving apparatus can be implemented that is capable of correcting not only the focusing direction and tracking direction but also biaxial rotation generating tilt of the optical axis, while yet having a simple construction.

What is claimed is:

1. An objective lens driving apparatus comprising:
   an objective lens constructed and arranged to direct a laser beam onto an optical information recording medium in an optical axis direction;
   an objective lens holder constructed and arranged to hold said objective lens;
   a suspension system consisting essentially of a single wire, one end of said wire being connected to said objective lens holder; and
   an electromagnetic driver constructed and arranged to effect an electromagnetic force to said objective lens holder.

2. An objective lens driving apparatus according to claim 1, wherein said objective lens holder has a magnetic property.

3. An objective lens driving apparatus according to claim 2, wherein said electromagnetic driver comprises at least three focusing coils constructed and arranged to drive said objective lens holder in the optical axis direction, said focusing coils being provided in a non-contacting relationship with said objective lens holder.

4. An objective lens driving apparatus according to claim 2, wherein said electromagnetic driver comprises a tracking coil constructed and arranged to drive said objective lens holder in a direction perpendicular to the optical axis direction, said tracking coil being provided in a non-contacting relationship with said objective lens.

5. An objective lens driving apparatus according to claim 1, wherein said wire extends in a direction perpendicular to the optical axis direction of said objective lens.

6. An objective lens driving apparatus according to claim 1, wherein said center of gravity of a objective lens holder lies on the line of extension of said wire.

7. An objective lens driving apparatus according to claim 2, wherein said objective lens holder comprises a permanent magnet.

8. An objective lens driving apparatus according to claim 1, wherein said objective lens holder is constructed so as to be affected a magnetic attractive force at least in a direction in which said wire provides tension.

9. An objective lens driving apparatus according to claim 3, wherein said objective lens holder is formed in a curved surface shape on a side facing said focusing coils.

10. An objective lens driving apparatus according to claim 4, wherein said objective lens holder is formed in a curved surface shape on a side facing said tracking coil.

11. An objective lens driving apparatus comprising:
    an objective lens constructed and arranged to direct a laser beam onto an optical information recording medium in an optical axis direction;
    an objective lens holder constructed and arranged to hold said objective lens;
    a flexible body having one end connected to said objective lens holder to suspend said objective lens so as to permit positional corrections of said objective lens holder utilizing linear motion components in the optical axis direction and in a direction perpendicular to the optical axis direction and a biaxial rotational component that allows tilting of the optical axis direction; and
    an electromagnetic driver for effecting an electromagnetic force to said objective lens holder.

12. An objective lens driving apparatus according to claim 11, wherein said objective lens holder has a magnetic property.

13. An objective lens driving apparatus according to claim 12, wherein said electromagnetic driver comprises at least three focusing coils constructed and arranged to drive said objective lens holder in the optical axis direction, said focusing coils being provided in a non-contacting relationship with said objective lens holder.

14. An objective lens driving apparatus according to claim 12, wherein said electromagnetic driver comprises a tracking coil constructed and arranged to drive said objective lens holder in a direction perpendicular to the optical axis direction, said tracking coil being provided in a non-contacting relationship with said objective lens.

15. An objective lens driving apparatus according to claim 11, wherein said flexible body extends in directions perpendicular to the optical axis direction of said objective lens.

16. An objective lens driving apparatus according to claim 11, wherein the center of gravity of said objective lens holder lies on a line of extension of said flexible body.

17. An objective lens driving apparatus according to claim 12, wherein said objective lens holder comprises a permanent magnet.

18. An objective lens driving apparatus according to claim 11, wherein said objective lens holder is constructed so as to be affected a magnetic attractive force at least in a direction in which said flexible body provides tension.

19. An objective lens driving apparatus according to claim 13, wherein said objective lens holder is formed in a curved surface shape on a side facing said focusing coils.

20. An objective lens driving apparatus according to claim 14, wherein said objective lens holder is formed in a curved surface shape on a side facing said tracking coil.

21. An objective lens driving apparatus comprising:
    an objective lens constructed and arranged to direct a laser beam onto an optical information recording medium in an optical axis direction;
    an objective lens holder constructed and arranged to hold said objective lens;
    a suspension system consisting essentially of two wires each having one end connected to said objective lens holder to suspend said objective lens holder so as to permit positional corrections of said objective lens holder utilizing linear motion components in the optical axis direction and in a direction perpendicular to the optical axis direction and a biaxial rotational component that allows tilting of the optical axis direction; and
    an electromagnetic driver for effecting an electromagnetic force to said objective lens holder.

22. An objective lens driving apparatus according to claim 21, wherein said wires are arranged in positions restricting the rotational component of said objective lens about the optical axis direction.

23. An objective lens driving apparatus according to claim 21, wherein said wires have a surface extending in a direction perpendicular to the optical axis direction of said objective lens and are arranged next to each other in the surface.

\* \* \* \* \*